Feb. 17, 1931.  J. L. COBB ET AL  1,792,892
FOOT MEASURING IMPLEMENT
Filed Dec. 28, 1927  2 Sheets-Sheet 1

Inventors
J.L.Cobb
H.C.Ogle
By Watson E. Coleman Attorney

Feb. 17, 1931. J. L. COBB ET AL 1,792,892
FOOT MEASURING IMPLEMENT
Filed Dec. 28, 1927  2 Sheets-Sheet 2

Inventors
J. L. Cobb
H. C. Ogle
By Watson E. Coleman
Attorney

Patented Feb. 17, 1931

1,792,892

UNITED STATES PATENT OFFICE

JOHN L. COBB AND HARRY C. OGLE, OF BAKER, OREGON, ASSIGNORS TO AUTOMATIC SHU-FIT COMPANY, OF BOISE, IDAHO, A CORPORATION OF IDAHO

FOOT-MEASURING IMPLEMENT

Application filed December 28, 1927. Serial No. 243,199.

This invention relates to foot measuring implements and more particularly to an improvement of the device illustrated in our copending application, Serial No. 215,474, filed August 25, 1927, for automatic foot measuring devices. This application is a continuation in part of said copending application.

An important object of the present invention is to provide a structure which will automatically and accurately measure and simultaneously register or indicate both the width and length of a foot. In this connection, it is pointed out that the width of the smallest last constructed in each size, varies in the different sizes, while the variation between widths in different sizes is substantially constant. Accordingly, an important object of the present invention is the provision of devices for measuring and registering lengths and widths which are so interconnected that the movable element of the width measuring device is shifted as the movable element of the length device is shifted, so that it will at all times normally occupy a position corresponding to the narrowest width of a given indicated length, while at the same time capable of either remaining stationary while the length measuring device operates, or of a further movement independently of the movable element of the length measuring device to provide for measurement of feet of greater than minimum widths in any given size.

A further object of the invention is the provision in a structure of this character of means whereby the movable elements of both the length and width measuring devices may be simultaneously moved to the points of their greatest separation from the stationary elements thereof, so that the foot may be placed in position without interference from the movable elements.

A further object of the invention is to provide a construction such that the measurement may be very readily accomplished and a mechanism provided which will be durable and efficient in service and a general improvement in the art.

These and other objects we attain by the construction shown in the accompanying drawings, wherein for the purpose of illustration is shown a preferred embodiment of our invention and wherein:—

Figure 4 is a vertical sectional view through the dialing mechanism;

Figure 5 is a detail view showing the upper faces of the dials.

Figure 1:
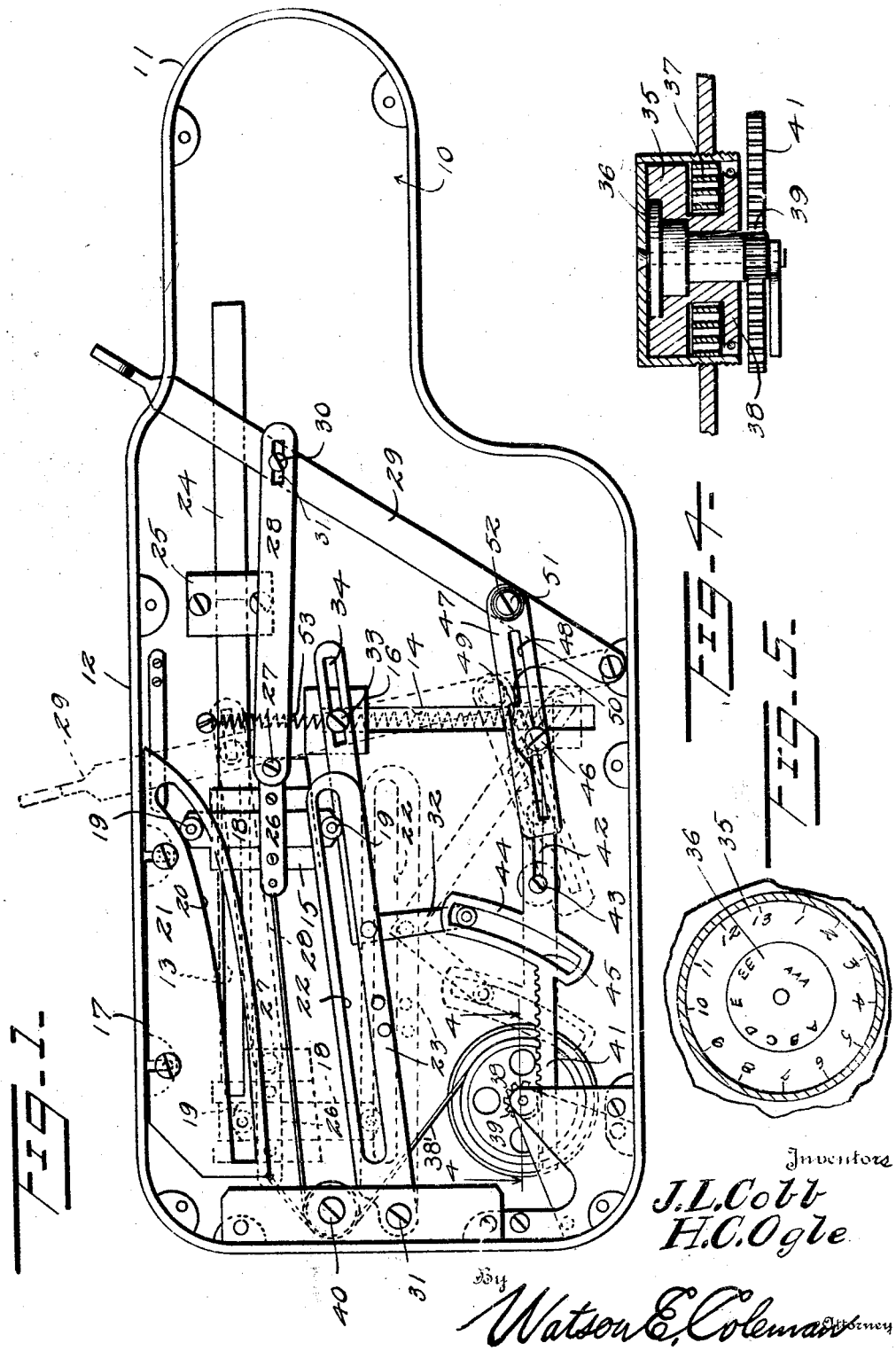
Figure 1 is a bottom plan view of a foot measuring implement constructed in accordance with our invention, the several parts being shown at opposite limits of their movement in solid lines and in dotted lines.
Figure 2:
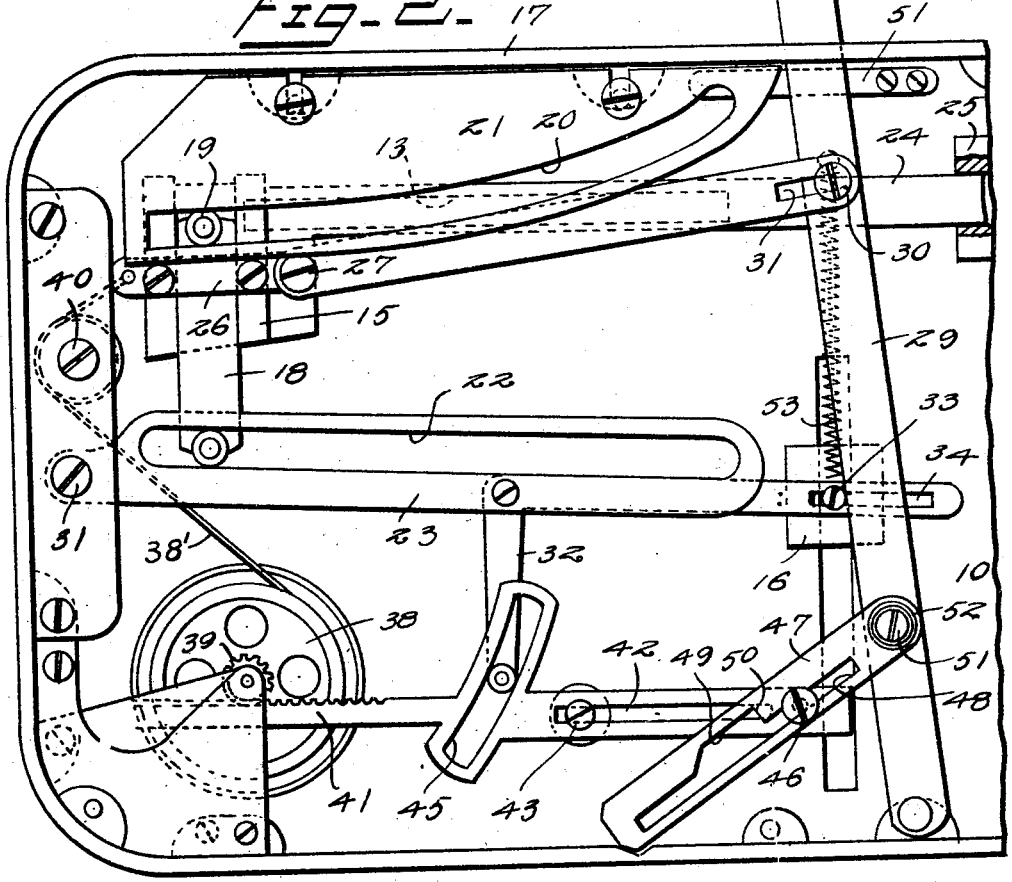
Figure 2 is a fragmentary bottom plan view showing the parts in the position which they assume when the side measuring device is released.
Figure 3:
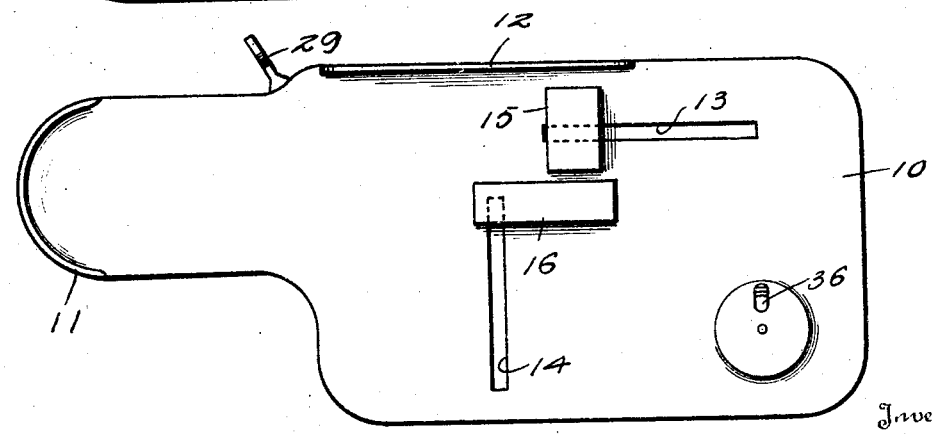
Figure 3 is a plan view of the foot measuring device.

Referring now more particularly to the drawings, the numeral 10 generally designates a platform having stationary rests for the heel and one side of the foot, indicated at 11 and 12 respectively. Formed in the platform are longitudinal and transverse slots 13 and 14, in which travel measuring contact blocks 15 and 16 adapted to engage against the toe and one side of the foot to cooperate with the stationary abutment rests 11 and 12.

Beneath the platform, which is provided with a depending flange 17, enclosing the mechanism now described, the block 15 has mounted thereon a transversely operating slide 18 having at its opposite ends rollers 19 operating in the cam slot 20 of a plate 21 and in the longitudinal slot 22 of a lever 23 respectively. The lever 23 forms a movable mounting for a part which will presently be described. The block 15 has secured thereto a guide stem 24 operating through a guide block 25, which prevents twisting and binding of the block 15 in its slot. The slide 18 is held in its guide by a strip 26, one end of which is provided with a pivot 27 to which one end of a link 28 is connected. Pivoted at one end to one side of the base and having its other end extended through a slot formed in the flange 17 at the opposite side of the platform casing is a lever 29 having a pivot screw 30 extending through a slot 31 formed in free end of the link 28.

The lever 23 extends longitudinally of the base and is pivoted through the flange at the end thereof remote from the heel rest 11, as indicated at 31. To this lever is pivoted a bell crank lever 32, one arm of which extends longitudinally of the lever 23 and projects under the block 16. This block 16 has a pivot screw 33 extending through and operating in a longitudinally extending slot 34 formed in the end of the bell crank arm. A coil spring 53 is connected at one end to the pivot screw 33 and at its opposite end is connected to the platform 10, as shown, to normally urge the width block 16 to positions indicating smaller widths.

The numerals 35 and 36 designate co-axial concentric dials, the dial 35 being rotated in one direction by an enclosed spiral spring 37, as in our copending application, and has a pulley 38, to which is secured one end of a cable 38'. The dial 36 has a pinion 39. The cable 38' is passed about an idler pulley 40 and connected with the retaining strip 26 which is attached to the block 15.

The numeral 41 designates a rack bar reciprocable longitudinally of the platform and meshing with the pinion 39. This rack bar has an extension, the end of which is longitudinally slotted, as indicated at 42, and has extended therethrough a guide pin 43, which is secured to the under side of the platform 10, so that transverse movement of this bar is prevented. Adjacent the end of the rack, the rack bar extension is provided with a transverse enlargement 44 having an arcuate slot 45 formed therein, the center of curvature of which is the pivot 31 of the lever 23. It will be obvious that if the lever 23 is shifted about its pivot, there will be no change in the relative positions of the lever 23 and bell crank 32, except under conditions hereinafter noted, as the slot 45 will maintain the bell crank 32 in fixed relation to the lever 23. Furthermore, the pivotal movement of the lever 23 will, in the absence of such conditions, have no effect upon the rack bar 41, so far as shifting the same is concerned. Consequently, it will be appreciated that the bell crank lever 32 and the slot 45 constitute a lost motion device, thereby allowing retraction of the length and width blocks 15 and 16 without causing movement of the width measuring dial unless the width block 16 is stopped by engagement with the side of the foot while the length block is permitted to move on. The dial 36, which is operated by this rack bar, indicates width measurements and a change from the shortest length to a given increased length, for instance, in changing from size 1 to 3½, will have no effect upon the width dial.

The outer end of the extension of the rack bar has attached thereto a pin 46. Frictionally pivoted to the lever 29 is an arm 47 having a slot 48 for the operation of the pin 46. This slot, intermediate its ends or at a point where simultaneous movement of the lever 29 and rack bar 41 is desired to effect operation of the width dial to change as the length dial indicates increased length above size 3½ upon resetting of the handle 29 and to cause the width dial to indicate width lasts corresponding to the normal width last for the different length sizes during separation of the stops 15 and 16, is enlarged, as at 49, forming a shoulder 50 facing toward the outer or free end of the arm. The pivot of the arm 47 is a screw 51 and at the head of this screw and this arm extends a spring 52, which firmly holds the arm against the lever 29, so that any change in position thereof is frictionally resisted.

The operation is as follows: To prepare the device for a measurement, the first step is to shift the lever 29 from its solid to its dotted line position. By this shifting movement through the link 28, the length block 15 is shifted to the remote end of its slot and the cable 38 being released is wound upon the pulley by the action of the spring 38, the dial 35 rotating until it registers 13, the longest size. At the same time, the arm 47, by the movement of the lever, initially moves free of the rack bar 41 until the length indicating dial 35 registers size 3½ and then the arm 47 has its shoulder 50 brought into engagement with the screw 46, so that the rack bar 41 is shifted longitudinally until the width dial 36 operated thereby registers the greatest width of last or EE. By this movement of the rack bar, the bell crank 32 is caused to rotate about its pivot upon the lever 23, with the result that the width block is shifted to the end of the slot remote from the fixed width stop 12. The foot to be measured is then placed upon the platform with the heel against the heel stop 11 and one side of the foot against the width stop 12. The lever 29 is then moved from its dotted toward its solid line position a short distance, during which movement it operates in the slot 31 of the link 28 and does not shift the length block 15. This movement releases the shoulder 50 from the screw 46, permitting the width block to move under the influence of a spring 53 attached thereto and to the base until it either engages with the side of the foot being measured or in case the foot being measured is narrower than the smallest width of a given size, the block 16 moves to a position where it automatically stops due to the pin 43 engaging the end of the slot 42, thereby causing the width dial to move to a position indicating the smallest width for all lengths of lasts. At this time, the rack bar 41 will be checked in its outward movement by engagement of the pin 43 in the end of the slot 42, and since the lever 23 does not move and the arm of the bell crank 32 is engaged with the rack bar, movement of the block 16 will be positively limited in a position corresponding to the size 13—4A. If the foot is narrower than this size, continued movement of the operating lever 29 from its dotted toward its solid line position will permit the block 16 to move toward the side of the foot and will shift the block 15 toward the toes of the foot. When the block 16 engages the side of the foot, its movement is checked and from this time on, movement of the block 15 toward the fixed stop 12 causes relative pivotal movement of the levers 23 and 32. This movement is, in turn, transmitted to the rack bar by the pin operating in slot 45 camming the rack bar and shifting the same so as to cause the width indicating dial 36 to indicate a larger width than the minimum for a given length; the final reading of the width indicating dial depending upon the distance which the block 15 moves toward the heel stop 11. When both blocks are in engagement with the foot, the dials show the correct reading both as to width and length.

Since the construction hereinbefore set forth is capable of a certain range of change and modification without materially departing from the spirit of the invention, we do not limit ourselves to such specific structure except as hereinafter claimed.

We claim:—

1. In a foot measuring device, pairs of length and width stops, one stop of each pair being movable toward and away from the other stop, means connecting the movable stops normally maintaining the width stop at a point corresponding to the width of the narrowest last of the length indicated by the position of the length stop, said means including lost motion means whereby increased separation of the width stops does not move the length stop, a reciprocable member operated by said width stop and a dial operated by said reciprocable member, said lost motion means including a part engaging the reciprocable member whereby the reciprocable member is unaffected by movements of the width stop under the influence of movements of the length stop but is shifted longitudinally when said width stop remains stationary.

2. In a foot measuring device, a base having pairs of stops for engagement with the ends and sides of a foot, one stop of each pair being movable toward and away from the other thereof, a dial for each pair of stops, operative connections between the dials and their respective stops, a lever having connections with the stops whereby movement thereof in one direction separates the stops of each pair a maximum distance, the connection between the end stop and said lever permitting limited movement of the lever in the opposite direction without affecting the position of said stop, the connection between the movable side stop and said lever being released by such limited movement of the lever, means constantly urging the side stop toward the stop with which it is associated, and means positively limiting such movement when the side stop is positioned to indicate the minimum width of a foot of the size indicated by the end stop.

3. In a foot measuring device, pairs of length and width stops, one stop of each pair being movable toward and away from the other stop, a lever pivoted at one end and extending in the general direction of movement of the length stop, a slide carried by the length stop, a cam, said slide engaging the cam and lever upon its opposite ends, a width dial, a reciprocable member for operating the width dial, said member having an arcuate slot curved with the pivot of the lever as a center, a bell crank pivoted to the lever and having a pin extending into the slot of the reciprocable member at the outer end of one arm thereof and having pin and slot connection with the width stop, means limiting movement of the reciprocable member in one direction, and a spring constantly urging the width stop toward its associated fixed stop.

4. In a foot measuring device, pairs of length and width stops, one stop of each pair being movable toward and away from the other stop, a lever pivoted at one end and extending in the general direction of movement of the length stop, a slide carried by the length stop, a cam, said slide engaging the cam and lever upon its opposite ends, a width dial, a reciprocable member for operating the width dial, said member having an arcuate slot curved with the pivot of the lever as a center, a bell crank pivoted to the lever and having a pin extending into the slot of the reciprocable member at the outer end of one arm thereof and having pin and slot connection with the width stop, means limiting movement of the reciprocable member in one direction, a spring constantly urging the width stop toward its associated fixed stop, a second lever, an arm upon said second lever and having a shoulder, an abutment on the reciprocable member with which the shoulder of the arm engages during movement of the lever in one direction and means frictionally holding the arm of the lever against rotation upon the lever.

5. In a foot measuring device, pairs of length and width stops, one stop of each pair being movable toward and away from the other stop, a lever pivoted at one end and extending in the general direction of movement of the length stop, a slide carried by the length stop, a cam, said slide engaging the cam and lever upon its opposite ends, a width dial, a reciprocable member for operating the width dial, said member having an arcuate slot curved with the pivot of the lever as a center, a bell crank pivoted to the lever and having a pin extending into the slot of the reciprocable member at the outer end of one arm thereof and having pin and slot connection with the width stop, means limiting movement of the reciprocable member in one direction, a spring constantly urging the width stop toward its associated fixed stop, a second lever, an arm upon said second lever and having a shoulder, an abutment on the reciprocable member with which the shoulder of the arm engages during movement of the lever in one direction, means frictionally holding the arm of the lever against rotation upon the lever, and a link connected to the length stop at one end and having pin and slot engagement with the last named lever at its opposite end.

6. In a device of the class described, relatively movable length and width determining members, common operating means for moving said members simultaneously and relatively, and means for moving said width determining member independently of said length determining member by actuation of said operating means.

7. In a foot measuring device relatively movable interconnected length and width determining members, common operating means for simultaneously moving said members to positions to indicate the largest last, said operating means including a lost motion connection with the length determining member, means connecting said length and width determining members including a lost motion device whereby said width determining member can be independently moved by said operating means to a position to indicate a narrower last for the same length without moving the length determining member, said interconnected length and width determining members being simultaneously and relatively movable thereafter upon continued movement of said operating means in the same direction.

8. In a foot measuring device, movable width and length stops, means operatively connecting said stops for effecting simultaneous proportional movement thereof, means normally urging said width stop in one direction, latch means normally restraining the action of aforesaid means, and means forming a connection between said latch means and said length stop for releasing said latch means.

9. In a foot measuring device, movable width and length stops, connecting means connecting said stops to cause their simultaneous proportional movement, means normally tending to urge said width stop in one direction, latch means adapted to normally restrain the normal urge of said width stop, an operating member forming a connection between said latch means and said length stop, and said operating member having lost motion means connected to said length stop and being movable to release said latch means and said width stop prior to its causing movement of said length stop.

10. In a foot measuring device, movable width and length stops, connecting means connecting said stops for causing their simultaneous proportional movement, reciprocating latch means for retaining said width stop in a predetermined position, means normally urging said latch means out of said position and said width stop in a predetermined direction, means movable with said length stop and serving to normally retain said latch means in said predetermined position.

11. In a foot measuring device, movable width and length stops, connecting means connecting said stops for causing their simultaneous proportional movement, reciprocable latch means adapted to normally retain said width stop in a predetermined position means normally urging said width stop in one direction, an operating lever having a lost motion connection with said length stop, and a pivoted frictionally held arm carried by said operating lever and adapted to engage said latch means to retain said width stop in its predetermined position but releasable upon initial movement of said operating lever to release said latch means and release said width stop to follow its normal urge.

12. In a foot measuring device, movable width and length stops, connecting means connecting said stops for causing their simultaneous proportional movement, a movable indicator operatively connected to each stop, means for moving said width indicating means independently of said connecting means including a lost motion device operatively connected to said connecting means and to said width indicating means.

13. In a foot measuring device, movable width and length stops, connecting means connecting said stops for causing their simultaneous proportional movement, width and length indicators, means operatively connecting said length indicator to said length stop, actuating means for said width indicating means connected to said width stop and said connecting means including lost motion means, means normally urging said width stop and width indicating means to a predetermined position, and releasable means adapted to normally restrain the normal action of said width stop and width operating means and being operable to release the same for movement independently of said length stop, by reason of said lost motion means, said lost motion means being effective for causing operation of said width indicating means when the normal movement of said width stop is restrained.

14. In a foot measuring device, a base, stops movable longitudinally and transversely of the base to engage the side and end of a foot arranged thereon, concentric rotatable length and width dials, operative connections between the dials and their respective stops for moving said dials, and means moving the side stop as the end stop is shifted without affecting the position of the width dial.

15. In a foot measuring device, a base, stops independently movable upon the base to engage the end and side of a foot, dials operatively connected to said stops, the connections of the side stop with its dial including a part bodily movable upon the base with the side stop without affecting the associated dial to thereby permit shifting of the side stop to compensate for variations in length.

16. In a foot measuring device, a base, stops independently movable upon the base to engage the end and side of a foot, length and width indicating dials operatively connected to said stops to indicate the positions thereof, the connections of the side stop with its width dial including a part bodily movable upon the base with the side stop without effecting movement of the width dial to thereby permit shifting of the side stop to compensate for variations in length, and means for moving said part as the end stop is shifted.

17. In a foot measuring device, a base, stops simultaneously movable upon the base to engage the end and side of the foot, length and width measuring dials operatively connected to said stops to indicate the positions thereof, the connections of the side stop with its width dial including a member connected to the side stop, a mounting thereof movable to shift the member and stop without affecting the associated width dial, and an operative connection between the mounting and end stop whereby the mounting is shifted as the end stop is shifted.

18. In a foot measuring device, a base, stops movable upon the base to engage the end and side of the foot, length and width measuring dials operatively connected to said stops to indicate the positions thereof, the connections of the side stop with its dial comprising a reciprocable dial operating element having a transverse slot, a lever having an arm engaged with one of said stops and a second arm having a pin engaged in said slot, and means operated by movement of the end stop for bodily shifting said lever transversely of the reciprocable element.

19. In a foot measuring device, a base, stops movable upon the base to engage the end and side of the foot, width and length indicating dials operatively connected to said stops to indicate the positions thereof, the connections of the side stop with its width dial comprising a reciprocable dial operating element having a transverse slot, a lever having an arm engaged with the side stop and a second arm having a pin engaged in the slot, a second lever upon which the first named lever is mounted, the slot of the reciprocable element being arcuately curved with the pivot of the last named lever as a center, and means operated by movement of the end stop for swinging the second lever about its pivot.

20. In a foot measuring device, a base, stops movable upon the base to engage the end and side of the foot, width and length indicating dials operatively connected to said stops to indicate the positions thereof, the connections of the side stop with its dial comprising a primary lever and a reciprocable element having a transverse slot, a secondary lever having an arm engaged with the stop and a second arm having a pin engaged in the slot, a cam, a movable member engaging the cam at one end and at the opposite end operatively engaging said primary lever, and means for shifting the member over the cam.

21. In a foot measuring device, a base, stops movable upon the base to engage the end and side of the foot, width and length indicating dials operatively connected to said stops to indicate the positions thereof, the connections of the side stop with its width dial comprising a reciprocable element having a transverse slot, a pivoted lever having an arm engaged with said side stop and a second arm having a pin engaged in the slot, a second pivoted lever upon which the first named lever is mounted, the slot of the reciprocable element being arcuately curved with the pivot of the last named lever as a center, a cam, a member engaging the cam at one end and at the opposite end operatively engaging said second lever and means for shifting said member over the cam.

22. In a foot measuring device, a base, stops movable longitudinally and transversely of the base to engage the side and end of a foot arranged thereon, concentric rotatable length and width dials, and operative connections between the dials and their respective stops.

23. In a foot measuring device, a base, stops movable longitudinally and transversely of the base to engage the side and end of a foot arranged thereon, concentric rotatable length and width dials, and operative connections between the dials and their respective stops, the connections of the side stop with its dial including a part bodily movable with the side stop without affecting the associated dial to thereby permit shifting of the side stop to compensate for variations in length.

24. In a foot measuring device, movable width and length measuring stops, connecting means connecting said stops for causing simultaneous proportional movement thereof, and a floating lever associated with said connecting means and width measuring stop whereby said length measuring stop is moved while said width measuring stop remains perfectly stationary.

25. In a foot measuring device, movable length and width measuring stops, connecting means connecting said stops for causing simultaneous proportional movement thereof in two directions, and lost motion means associated with said connecting means and operatively connected to said width measuring stop, to render said length stop movable while said width stop remains perfectly stationary.

26. In a foot measuring device, movable length and width measuring stops, connecting means connecting said stops for causing simultaneous proportional movement thereof, lost motion means associated with said connecting means and width stop to render said length stop independently movable while said width stop remains perfectly stationary, and movable width and length indicating means, means operatively connecting said indicating means and said stops, said width indicating means being operated by said lost motion means and said connecting means upon independent movement of said length stop.

27. In a foot measuring device, movable width and length measuring stops, length and width indicating means operatively connected to said stops, connecting means connecting said stops for causing simultaneous proportional movement thereof, lost motion means having connection with said connecting means and said width stop and width indicating means to render said width indicating means idle while the width and length stops are moved simultaneously, and said connecting means operating said width indicating means through said lost motion means while said width stop remains perfectly stationary and said length stop is moved.

28. In a foot measuring device, movable width and length measuring stops, rotatable concentric width and length indicating dials operatively connected to said stops, connecting means connecting said stops for causing simultaneous proportional movement thereof, lost motion means having connection with said connecting means and said width indicating dial and width stop to render said width indicating dial idle while the width and length stops are simultaneously moved, and said connecting means operating said width indicating dial by said lost motion means while said width stop remains perfectly stationary and said length stop is moved.

29. In a foot measuring device, movable width and length measuring stops, width and length indicating means operatively connected to said stops, connecting means connecting said stops for causing simultaneous proportional movement thereof and including means shiftable in proportion to the movement of said length measuring stop, lost motion means forming a connection between said connecting means and said width indicating means and said width stop to render said width indicating means idle while the width and length stops are simultaneously moved, and said connecting means operating said width indicating means through said lost motion means while said width stop remains perfectly stationary and said length stop is moved.

30. In a foot measuring device, movable width and length measuring stops, connecting means connecting said stops for causing simultaneous proportional movement thereof, said means including lost motion means to render independent movement of either one or the other of said stops while the other stop remains perfectly stationary.

31. In a foot measuring device, a movable length stop, width and length indicating means operatively connected to said stop, connecting means connecting said length stop with said length indicating means, and a lost motion device operatively connected to said length stop and having operative connection with said width indicating means.

32. A foot measuring device comprising a base, longitudinally and transversely movable stops movable thereon, connecting means between said stops whereby they can be moved simultaneously, an operating handle for actuating said connecting means to move said stops, and lost motion means included in said connecting means to render said transversely movable stop idle when moved into engagement with a foot while said longitudinally movable stop is moved upon movement of said operating handle.

33. A foot measuring device comprising a base, longitudinally and transversely movable stops movable thereon, connecting means between said stops whereby they can be moved simultaneously, an operating handle for actuating said connecting means to move said stops, lost motion means included in said connecting means to render said transversely movable stop idle when moved into engagement with a foot while said longitudinally movable stop is moved upon movement of said operating handle, and said connecting means including means for increasing the unit of advance of said transversely movable stop per unit of advance of said longitudinally movable stop as the latter is moved.

34. A foot measuring device comprising a base, longitudinally and transversely movable stops mounted thereon, connecting means connecting said stops whereby they can be moved simultaneously, said connecting means including a lever, and a second lever pivoted thereto and having operative connection directly with said transversely movable stop.

35. A foot measuring device comprising a base, longitudinally and transversely movable stops mounted thereon, connecting means connecting said stops whereby they can be moved simultaneously, said connecting means including a lever, a second lever pivoted thereto and having operative connection directly with said transversely movable stop, and means associated with said second lever for permitting independent movement of said transversely movable stop.

36. A foot measuring device comprising a base, longitudinally and transversely movable stops mounted thereon, connecting means connecting said stops whereby they can be moved simultaneously and independently, and said connecting means including a lever, a bell crank pivoted thereto and having one arm pivoted to said transversely movable stop, an indicator, and a movable member for operating said indicator and having connection with the other arm of said bell crank for permitting movement of said member upon movement of said bell crank relative to said lever.

37. A foot measuring device comprising a base, longitudinally and transversely movable stops mounted thereon, connecting means connecting said stops whereby they can be moved simultaneously and independently, said connecting means including a lever, a bell crank pivoted thereto and having one arm pivoted to said transversely movable stop and adapted to move in unison with said lever upon simultaneous movement of said stops and to move relative to said lever upon independent movement of said transversely movable stop, an indicator, and an indicator actuator having connection with the other arm of said bell crank whereby said actuator is moved upon independent movement of said transversely movable stop, said connection being inoperative to move said actuator upon simultaneous movement of said stops.

38. In a foot measuring device, a base, length and width stops movable upon the base to engage the end and side of a foot, length and width indicators operated by the movement thereof, and means operatively connecting said stops and indicators for moving the width stop as the length stop is shifted, said means including a lost motion device for connecting the width indicator with said first mentioned means to render the width stop idle while the length stop is moved to cause movement of both the length and width indicators.

39. In a foot measuring device, movable width and length measuring stops, movable length and width indicating means operatively connected to said stops, connecting means connecting said stops for causing simultaneous proportional movement thereof, and including a floating bell crank having connection with said width measuring stop and the width indicating means to render said width indicating means idle while the two stops are moved simultaneously, and said connecting means operating said last named indicating means while its respective stop remains stationary and the other stop is moved.

40. In a foot measuring device, movable width and length measuring stops, length and width indicating means operatively connected to said stops, connecting means connecting said stops for causing simultaneous proportional movement thereof, a floating bell crank fulcrumed upon said connecting means and connected with said width stop and width indicating means to render said width indicating means idle while the width and length stops are moved simultaneously, and said connecting means operating said width indicating means through said bell crank while said width stop remains perfectly stationary and said length stop is moved.

41. In a foot measuring device, a size determining stop, a size indicator, means operatively connecting said indicator with said stop whereby to cause movement of the indicator by movement of said stop, and including means to render said indicator idle while said stop is moved.

42. A foot measuring device comprising a movable stop member, a registering indicator actuated thereby, actuating means connecting said stop member and indicator, said actuating means including means for moving said indicator initially to a position indicating a narrower width than the maximum width last, and means for causing said indicator to remain in said position during continued movement of said stop in the same direction.

43. A foot measuring device comprising a movable stop member, a registering indicator actuated thereby, actuating means connecting said member and indicator, said actuating means including means for moving said indicator initially to a position indicating a narrower width than the maximum width last, means for causing said indicator to remain in said position during continued movement of said stop in the same direction, and means for moving said indicator with the width stop upon reverse movement of said actuating means.

44. A foot measuring device comprising a movable stop member, a registering indicator actuated thereby, actuating means connecting said member and indicator, said actuating means including means for moving said indicator initially to a position indicating a narrower width than the maximum width last, means for causing said indicator to remain in said position during continued movement of said stop in the same direction, and means cooperating with said last named means for moving said indicator with said stop member upon reverse movement of said actuator means.

In testimony whereof we hereunto affix our signature.

JOHN L. COBB.
HARRY C. OGLE.